United States Patent [19]
Hayashi

[11] Patent Number: 5,623,967
[45] Date of Patent: Apr. 29, 1997

[54] PILOT SWITCH VALVE

[75] Inventor: Bunya Hayashi, Yawara-mura, Japan

[73] Assignee: SMC Corporation, Tokyo, Japan

[21] Appl. No.: 509,458

[22] Filed: Jul. 31, 1995

[30] Foreign Application Priority Data

Sep. 13, 1994 [JP] Japan .................................. 6-244825

[51] Int. Cl.$^6$ .............................................. F15B 13/043
[52] U.S. Cl. .................... 137/625.64; 92/165 R; 137/625.66; 251/63.4
[58] Field of Search ..................... 92/165 R, 165 PR; 137/625.64, 625.66; 251/63.4

[56] References Cited

U.S. PATENT DOCUMENTS

| | | | |
|---|---|---|---|
| 4,434,966 | 3/1984 | Zajac | 137/625.66 |
| 5,007,328 | 4/1991 | Otteman | 92/165 R X |
| 5,437,306 | 8/1995 | Asou et al. | 137/625.64 |

*Primary Examiner*—Gerald A. Michalsky
*Attorney, Agent, or Firm*—Oblon, Spivak, McClelland, Maier & Neustadt, P.C.

[57] ABSTRACT

Piston boxes are attached to both ends of a valve body of a main valve segment having multiple ports and an axial valve port. Projections extending toward the valve port are provided in piston chambers provided in the piston boxes. The pistons have pressing tips to push the valve member and recesses and adapted to accommodate the sliding projections. The relative motion between the projections and recesses guide the slide of the pistons.

2 Claims, 3 Drawing Sheets

PILOT SWITCH VALVE

FIELD OF THE INVENTION

This invention relates to pilot change-over valves whose operation is switched by compressed air or other pilot pressurized fluids.

BACKGROUND OF THE INVENTION

Known plot change-over valves whose operation is switched by pilot pressurized fluids include, for example, one that comprises a main valve segment and a pilot valve segment. The main valve segment has two or more ports, valve ports into which said ports open, valve members slidably fitted in the valve ports, first and a second piston chambers respectively provided at both ends of the valve ports, and first and a second pistons to move the valve members slidably fitted in the piston chambers. The pilot valve segment supplies a pilot fluid to the first and second piston chambers to move the first end second pistons. The change-over valve thus switches the operation of the valve members through the motion of the pistons.

In this type of conventional pilot change-over valves, however, the pistons are liable to tilt when they slide in the piston chambers because the axial length of each of the pistons is shorter than the diameter thereof. The resulting eccentric load working on the pistons has caused excessive wear of sealing members and unstable valve operations. The conventional change-over valves of the type described above thus have lacked adequate durability and operational stability.

These problems can be solved by increasing the axial length of the pistons. However, increasing the axial length of the pistons necessitates increasing the axial length of the piston chambers and, as a consequence, the size of the change-over valve.

SUMMARY OF THE INVENTION

The object of the invention is to provide small pilot change-over valves having superb operational stability and durability that are obtained by preventing tilting of the pistons during their reciprocation without increasing the axial length thereof. The pilot change-over valves according to this invention assure smooth motion of the pistons and prevent the creation of eccentric loads.

In order to achieve the above object, a change-over valve according to this invention comprises a main valve segment having a valve member slidably fitted in a valve port, a piston chamber formed at an end of the valve port, and a piston slidably fitted in the piston chamber, with the piston being moved by a pilot fluid adapted to switch the operation of the valve member and a pilot valve segment supplying or discharging the pilot fluid to or from the main valve segment. The piston chamber has a columnar projection extending therein and along the axis thereof while the piston has a long recess in which the projection is slidably fit. The projection and recess, in combination, guide the reciprocation of the piston.

The piston of a preferred embodiment of this invention has a columnar pressing tip adapted to fit in the valve port, with the recess extending into the pressing tip.

Another preferred embodiment of this invention has the piston chamber holding the piston described earlier on each side of the valve member, with the piston chamber and the piston at least on one side having the axial projection and recess described above.

In this type of pilot change-over valve, the pilot fluid supplied from the pilot valve segment into the piston chamber moves the piston that switches the operation of the valve member.

The reciprocating piston does not tilt because the motion thereof is guided along the projection provided in the piston chamber and fitted in the recess formed on the piston. The smooth and stable motion of the piston thus assured creates no eccentric load due to tilting, thereby eliminating the production of uneven wear of seal packing member and other members and, as a consequence, increasing the durability of the change-over valve. Because the tilting of the piston can be prevented without increasing the axial length thereof, there is no need to increase the size of the change-over valve. The size of the change-over valve can even be reduced by making the axial length of the piston shorter than is conventionally possible.

Provision of the pressing tip to press the valve member on the piston and extension of the recess thereto prevent an undesired increase in the axial length of the piston chamber and piston.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
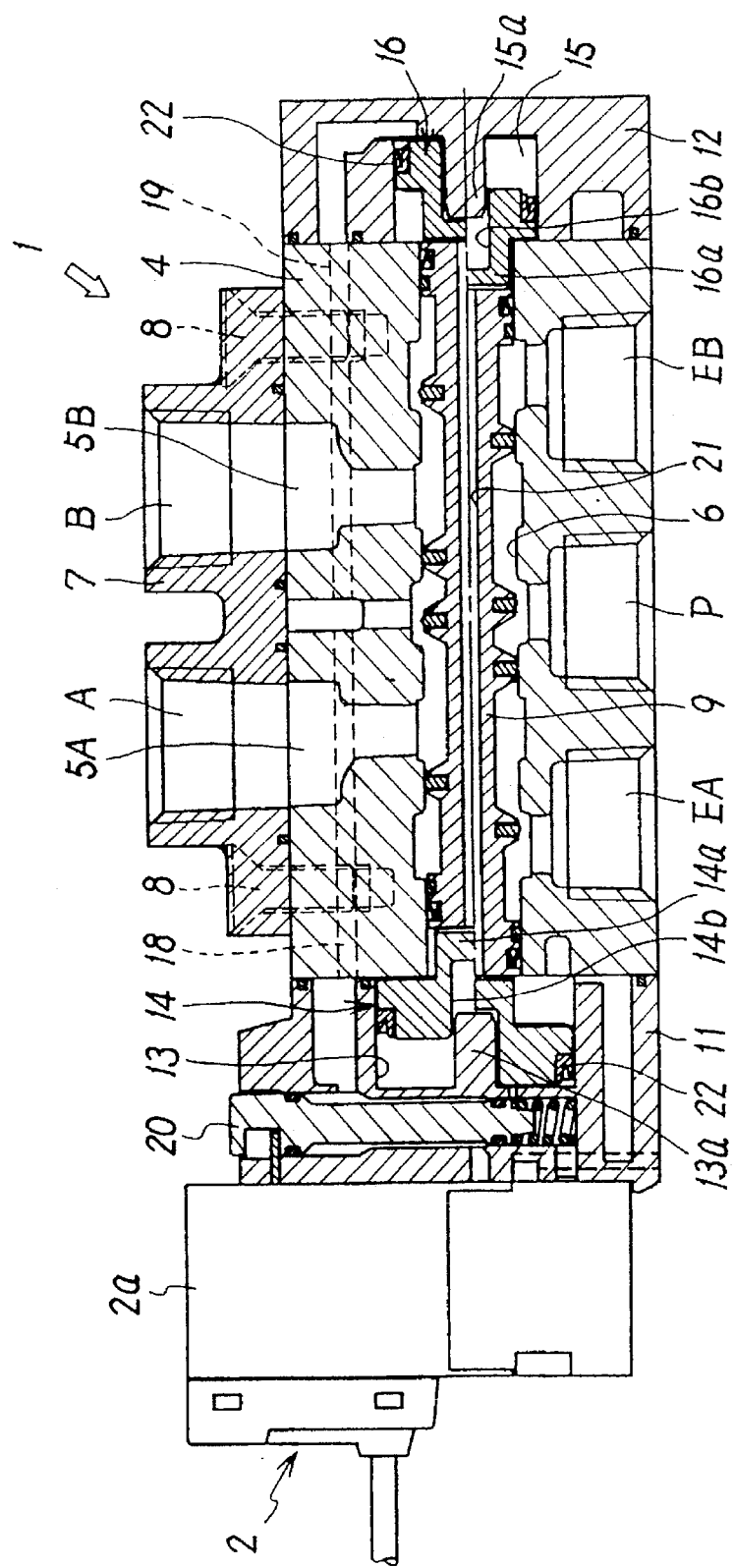
FIG. 1 is a cross-sectional view showing a first change-over valve embodying the principle of this invention.

FIG. 1 is a cross-sectional view showing a first change-over valve embodying the principle of this invention that comprises a main valve segment 1 and an electromagnetically actuated pilot valve segment 2.

The main valve segment 1 has a valve body 4 that is a rectangular parallelpiped, extending widthwise in the figure, in shape. The valve body 4 has a feed port P and discharge ports EA and EB through which a stream of compressed air flows in the bottom surface thereof and output ports 5A and 5B in the top surface, with an axially long valve port 6 into which all said ports open provided in the valve body 4. An adapter 7 having output ports A and B individually communicating with the output ports 5A and 5B is fastened with screws 8 to the surface wherein the output ports 5A and 5B open.

In the valve port 6 is slidably fit a spool-like valve member 9 through which communication between the output ports A and B and the feed port P and discharge ports EA and EB is switched.

A first and a second piston boxes 11 and 12 are respectively attached to the axial ends of the valve body 4 with appropriate means. The first piston box 11 has a first piston chamber 13 that holds a first piston 14 slidably fit therein. The second piston box 12 has a second piston chamber 15 that is smaller than the first piston chamber 13. The second piston chamber 15 holds a second piston 16, the diameter of which is smaller than that of the first piston 14, slidably fit therein. The first piston 14 and second piston 16 have a first pressing tip 14a and a second pressing tip 16a, both being columnar in shape, that are adapted to be fit in the valve port 6 to press the valve member 9.

First and a second cylindrical projections 13a and 15a formed in the first and second piston chambers 13 and 15 integrally project from the wall of each chamber toward the valve port 6 along the central axis thereof. The first and second pistons 14 and 16 have a first and a second cylindrical recesses 14b and 16b to accommodate the first and second projections 13a and 15a that slide into and out of them. The recesses extend to the pressing tips 14a and 16a, respectively.

It is preferable to cut one or more grooves on the side of the projections 13a and 15a parallel to the axis thereof to establish communication between the piston chambers 13 and 15 and the recesses 14b and 16b.

The pilot valve segment 2 is a three-port solenoid valve of known type having a pilot feed, an output and a discharge port not shown and bringing the pilot output port alternately into communication with the pilot feed port and the pilot discharge port by activating and deactivating the solenoid 2a.

The pilot feed port communicates with a feed port P by means of a pilot passage 18 provided in the valve body 4 and the first piston box 11, the pilot output port communicates with the first piston chamber 13 by means of a passage not shown, and the pilot discharge port communicates with the outside. The second piston chamber 15 always communicates with the feed port P by means of a passage 19 provided in the valve body 4 and the second piston box 12.

Reference numeral 20 in FIG. 1 designates a push button that manually brings the pilot passage 18 into direct communication with the first piston chamber 13, 21 a communication duct that connect the breathing chambers behind the first and second pistons 14 and 16, and 22 sealing packings fitted on the periphery of the pistons 14 and 16.

When the first piston chamber 13 of the first embodiment contains no pilot air, the pressing tip 16a of the second piston 16, which is actuated by the air pressure supplied to the second piston chamber 15, pushes the valve member 9 to the left as shown in the lower half of FIG. 1, thereby bringing into communication the feed port P with the output port B and the output port A with the discharge port EA.

When pilot air is supplied from the pilot valve segment to the first piston chamber 13 by activating the solenoid 2a, the first piston 14 pushes the valve member 9 and second piston to the right as shown in the upper half of FIG. 1 because the air pressure working on the larger first piston 14 is greater than that working on the smaller second piston 16, thereby bringing into communication the feed port P with the output port A and the output port B with the discharge port EB.

In this state, the pistons 14 and 16 move smoothly without tilting as they are guided by the first and second projections 13a and 15a that fit in the first and second recesses 14b and 16b in the first and second pistons 14 and 16. The smooth motion thus secured keeps the pistons 14 and 16 free from unbalanced loading that might be imposed when they are tilted. The absence of unbalanced loading eliminates the nonuniformwear of the sealing packing and increases the durability of the switch valve. Elimination of the need of increasing the length of the pistons 14 and 16 to prevent the tilting thereof prevents an increase in valve size. Rather, valve size can even be reduced by using shorting pistons than conventional ones.

Despite the presence of the recesses 14b and 16b, there is no need to increase the length of the pistons 14 and 16 because the first and second recesses 14b and 16b accommodating the projections 13a and 15a extend to the pressing tips 14a and 16a of the pistons 14 and 16. This design permits further size reduction of the pilot switch valve.

Figure 2A:
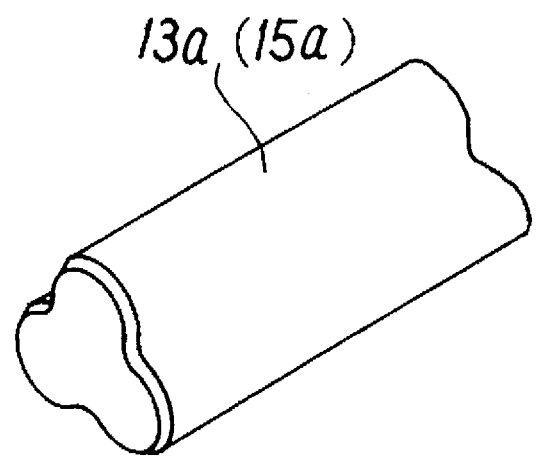
FIGS. 2A and 2B are perspective views showing modifications of the projection.
Figure 2B:
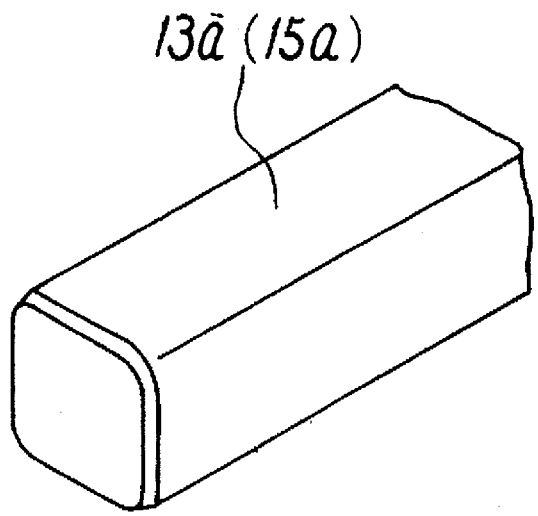

The cross-sectional shape of the first and second projections 13a and 15a need not be circular. They may be of any shape so long as they fit in the first and second recesses 14b and 16b of circular cross-section without backlash. Their cross-section may have either a cloverleaf or other similar triangular shape as shown in FIG. 2A or a square shape as shown in FIG. 2B. These cross-sectional shapes reduce the area of contact between the projections and recesses.

The cross-sectional shape of the first and second recesses 14b and 16b too need not be limited to circular. For example, they may have cross-sectional shapes similar to those of the projections shown in FIGS. 2A and 2B.

In the first embodiment described above, the projections 13a and 15a and the recesses 14b and 16b are provided in both of the two piston chambers 13 and 15 and the two pistons 14 and 16. Instead, the projection and recess may be provided in only either one of the two piston chambers and pistons. Then, the piston chamber and piston having no projection and recess must be long enough to ensure the smooth and straight motion of the piston. Even this modified embodiment is smaller than conventional switch valves with two long piston chambers and pistons.

Figure 3:
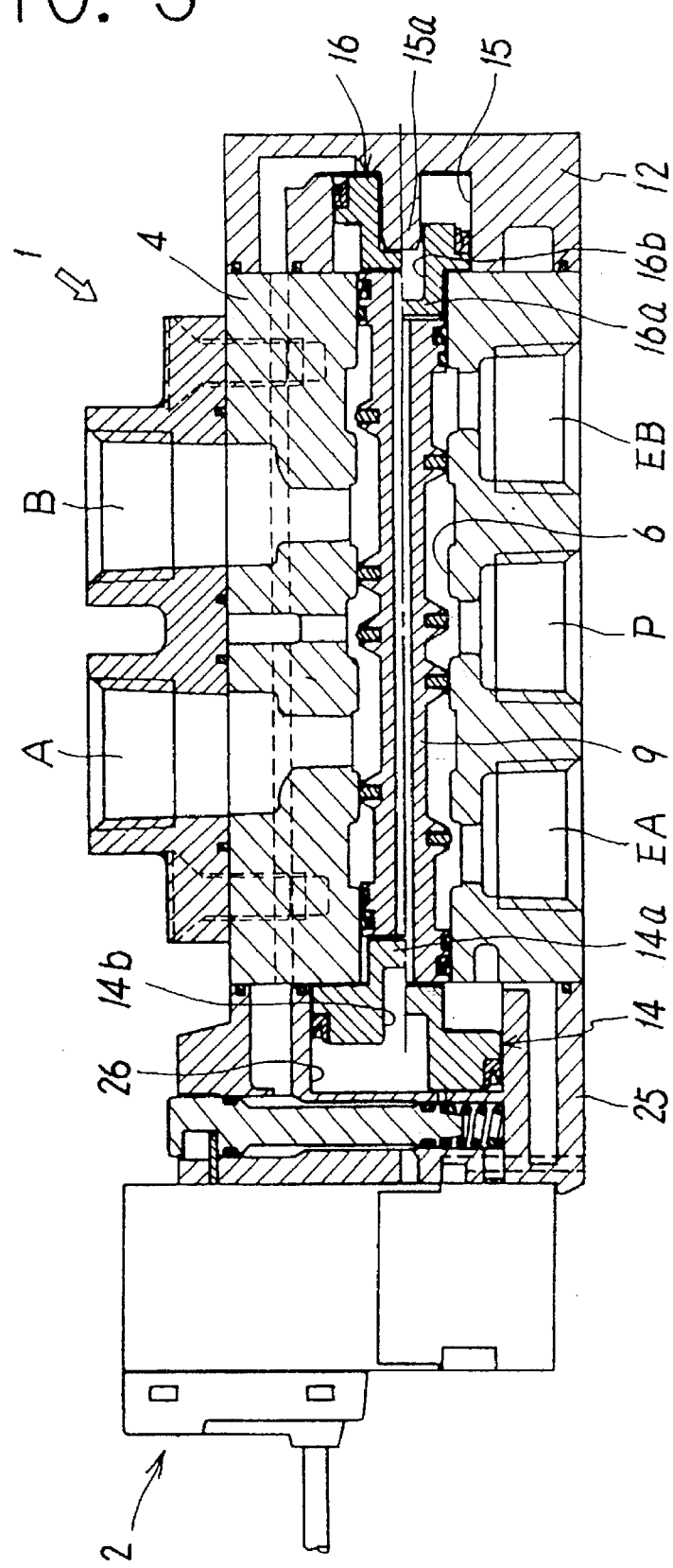
FIG. 3 is a cross-sectional view showing a second change-over valve embodying the principle of this invention.

A second embodiment shown in FIG. 3 has the projection and recess in only one of the two piston chambers and two pistons. While the second piston chamber 15 and the second piston 16 have the second projection 15a and the second recess 16b, the first piston chamber 26 has no projection. The recess 14b formed in the first piston 14 may be eliminated.

A detailed description of the second embodiment is omitted here as it is substantially analogous to the first embodiment in other respects, with similar parts being designated by similar reference characters in FIG. 3.

The projections and recesses of the second embodiment too may have cross-sectional shapes other than circular, as shown in FIGS. 2A and 2B.

As a variation of the embodiment shown in FIG. 3, the projection and recess may be provided in the first piston chamber and the first piston, with the projection in the second piston chamber omitted.

In all embodiments described above, the valve member 9 is switched by means of the two pistons 14 and 16 of different sizes disposed on both sides thereof. However, the valve member 9 may also be switched by the piston 14 alone, with the smaller piston 16 replaced with a return spring. Or, the valve member may be switched by supplying a pilot fluid from two pilot valve segments to two pistons 14 and 16 of similar diameters but of the same diameter. In brief, this invention is applicable to all types of pilot switch valves whose valve members are switched through pistons.

The five-port valve constituting the main valve segment 1 of the embodiments described above may be replaced with a three-port or a four-port valve. The pilot valve segment 2 too may be operated not only by electromagnetic means but also by mechanical or other means.

As described before, the pistons of the pilot switch valves according to this invention guided by the projections move smoothly and stably without tilting. The absence of the unbalanced loading that might occur when the pistons tilt eliminates unbalanced wear of seal packings and other parts and increases the service life of the switch valves.

The absence of the need to increase the length of the pistons for the prevention of tilting not only prevents an increase in the size of switch valves but also permits a substantial size reduction by allowing the use of shorter pistons.

Furthermore, the provision of the valve member pressing tips on the pistons and the recesses extending thereto eliminates the need to increase the length of the piston chambers and pistons.

Obviously, additional modifications and variations of the present invention are possible in light of the above teachings. It is therefore to be understood that within the scope of the appended claims, the invention may be practiced otherwise than as specifically described herein.

What is claimed is:

1. A pilot switch valve, comprising:

a valve body having a valve port formed therein;

a main valve segment having a valve member slidably fitted in the valve port, a first piston chamber formed at an end of the valve port, and a first piston slidably fitted in the piston chamber and positioned so as to be separate from said valve member, the first piston being moveable by a pilot fluid source switching the operation of the valve member and a pilot valve segment respectively supplying and discharging the pilot fluid to and from the main valve segment, the first piston chamber having a columnar projection extending integrally from a wall portion of said piston chamber and along the axis thereof, the first piston having a long recess in which the projection is slidably fitted, and the projection and recess, in combination, guiding reciprocation of the first piston wherein the piston comprises a columnar pressing tip which is fitted in the valve port and the recess extends to an inside portion of the columnar pressing tip.

2. The improvement according to claim 1, which comprises a second piston chamber and a second piston wherein the second piston chamber and second piston are provided on an end of the valve member opposite said first piston chamber and said first piston and wherein said projection and recess are formed on at least one of the first and second piston chambers and the first and second piston.

* * * * *